Patented Nov. 27, 1951

2,576,898

UNITED STATES PATENT OFFICE 2,576,898

SEMIESTERS OF UNSATURATED DICARBOXYLIC ACIDS

Otto Albrecht, Neuewelt, near Basel, Switzerland, assignor to Ciba Limited, a Swiss firm No Drawing. Application August 20, 1948, Serial No. 45,436. In Switzerland April 9, 1945

14 Claims. (Cl. 252—8.75)

1

This application is a continuation-in-part of my application Serial No. 655,364, filed March 18, 1946 (now abandoned).

The present invention relates to a water-soluble composition of matter producing a softening effect on regenerated cellulose when applied in hard water which comprises (a) a water-soluble salt of a semi-ester obtainable by reacting 1 molecular proportion of an aliphatic compound having at least 12 carbon atoms and containing at least one alcoholic hydroxyl group, at least one hetero-atom interrupting the carbon chain, and being free from basic nitrogen atoms, with 1 molecular proportion of an unsaturated aliphatic or cycloaliphatic dicarboxylic acid or a functional derivative thereof, and (b) a lime-resistant dispersing agent, in which an aliphatic radical containing at least 12 carbon atoms is bound to a sulfonic acid group by a bridge containing at least one hetero atom.

As aliphatic compounds having at least 12 carbon atoms and containing at least one aliphatic hydroxyl group and at least one heteroatom interrupting the carbon chain, and free from basic nitrogen atoms, there may be used, for example, the following: N-hydroxyalkyl amides and hydroxyalkyl esters of higher fatty acids, such as N-(β-hydroxyethyl)-palmitic acid amide, N-(β-hydroxyethyl)-stearic acid amide, N-(β-hydroxyethyl)-oleic acid amide, N-(2-hydroxypropyl)-stearic acid amide; or stearic acid β-hydroxyethyl ester; hydroxyalkyl ethers of higher fatty alcohols, such as octadecyl alcohol β-hydroxyethyl ether; and also thio-ethers of high molecular weight containing hydroxyalkyl groups such as octadecyl-β-hydroxyethyl thioether. These examples show that in this invention the compounds used as starting materials may contain N, O or S as hetero-atoms. Products containing N or O atoms as hetero-atoms are especially suited as starting materials for they are very easy to obtain. N and O atoms may be designated as hetero-atoms having an atomic weight of 14 to 16. N-hydroxy-alkylamides and hydroxyalkylesters, the hetero-atoms of which are N- or O-atoms, have a number of properties in common. They are neutral substances; are easily soluble in organic solvents; owing to their common OH-group they readily emulsify in water; and are saponified by boiling with mineral acids during which operation fatty acids are formed.

Among the unsaturated aliphatic or cycloaliphatic dicarboxylic acids to be used as starting materials the following may be mentioned as examples: Ethylene-α:β-dicarboxylic acids, that is to say fumaric acid or maleic acid; also cyclohexene dicarboxylic acids, for example, addition products of maleic acid with butadiene or its homologs, such as tetrahydrophthalic acid (the addition product of maleic acid with butadiene). As functional derivatives of these dicarboxylic acids there are especialy suitable their anhydrides.

The reaction of the hydroxyl compounds with the dicarboxylic acids may be carried out by heating a mixture of the starting materials, advantageously with the addition of a small quantity of a strong acid, until 1 molecular proportion of water has been split off. It is of advantage, however, to heat the hydroxyl compound with the dicarboxylic anhydride, for example, at 90–120° C., until a test portion of the reaction mixture dissolves in a dilute solution of sodium hydroxide.

The semi-esters of the compositions of matter according to the present invention are soluble in water in the form of their alkali salts, or in the form of salts of water-soluble amines or in the form of ammonium salts and can be used as textile assistants. The alkali salts of the new semi-esters, owing to their capillary activity, can be used as foaming or cleansing agents. Special mention must be made of the soft feel which is imparted to cellulose fibers, especialy in hard water, by the salts of the semi-esters of the invention when they contain an aliphatic residue of at least 16 carbon atoms, preferably 16–18 carbon atoms. The alkali salts of the semi-esters are distinguished by an especially good solubility in neutral or weakly acid liquors used in the textile industry, especially in baths used to impart anti-creasing properties to textiles. Textiles which have been rendered anti-creasing with the addition of water-soluble salts of the semi-esters of this invention possess a soft and flowing feel. The composition of matter of the present invention, however, are even more effective, because they do not form precipitations in hard water.

The following substances are examples of lime-resistant dispersing agents which may be contained in the compositions of matter of the present invention: water-soluble salts of sulfonated fatty alcohols or of sulfonated N-hydroxy-alkylamides of higher fatty acids or of aliphatic amino sulfonic acids, hydroxy sulfonic acids which are acylated at the amino or hydroxy group respectively by higher fatty acids; water-soluble salts of monoesters of higher fatty alcohols and 4- sulfophthalic acid; water-soluble salts of sulfonated μ-alkyl-benzimidazoles wherein the μ-alkyl radical contains at least 11 carbon atoms such as the alkali metal salts of N-benzyl-μ-heptadecyl-benzimidazole disulfonic acid; water-soluble salts of condensation products of the formula

R—CO—NH—CH$_2$—S—CH$_2$—CH$_2$—SO$_3$H wherein R—CO— is the acyl radical of a fatty acid containing at least 12 carbon atoms. Products of the last named type are obtainable by condensing N-methylolamides of fatty acids with β-mercapto ethane sulfonic acid. The substances mentioned above are especially effective lime-resistant dispersing agents and are characterized by the fact that an aliphatic radical containing at least 12 carbon atoms is bound to a sulfonic acid group by a bridge containing at least one hetero-atom. In the above examples the hetero atoms are nitrogen, oxygen or sulfur atoms.

The compositions of matter of the present invention may contain, for instance, about 10–50 per cent of a lime-resistant dispersing agent. Mixtures containing about 20–40 per cent of these dispersing agents are especially valuable.

Among the semi-esters used in the present invention there are particularly easily obtained water-soluble salts, for instance alkali metal salt, ammonium salts and amine salts, of semi-esters of the formula

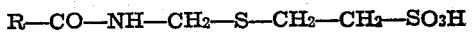

wherein

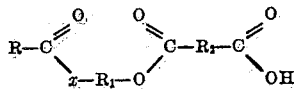

is the acyl radical of a fatty acid containing at least 12 carbon atoms, $x$ is a member selected from the group consisting of imino nitrogen and oxygen, R$_1$ is alkylene, and R$_2$ is unsaturated alkylene.

The following formulae illustrate some of the groups of the products of this invention:

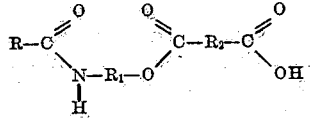

wherein R, R$_1$ and R$_2$ have the meaning indicated above;

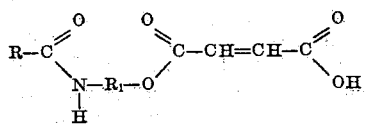

wherein R and R$_1$ have the meaning indicated above,

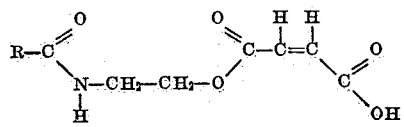

wherein

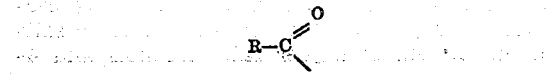

has the meaning given above;

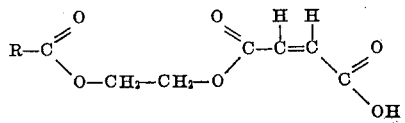

wherein

has the meaning given above.

The following examples illustrate the invention, the parts being by weight:

Example 1

32.5 parts of N-(β-hydroxyethyl)-stearic acid amide and 9.8 parts of maleic anhydride are stirred at 95–100° C. until a test portion when neutralized with sodium hydroxide solution dissolves in water to give a clear solution. This is the case after about 3 hours. The resulting acid ester of maleic acid is then converted into its sodium salt by neutralization with sodium hydroxide or sodium carbonate, advantageously after being previously dissolved in ethyl alcohol. After being dried, the sodium salt of the new semi-ester of the formula

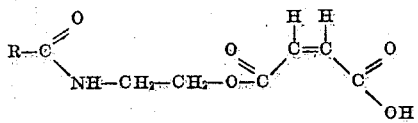

wherein

represents the acyl radical of commercial stearic acid, is an approximately colorless powder, which, when taken up in water, forms a clear, foaming solution. It may be used as a textile assistant, for example, as a very effective softening agent for cellulose fibers. For this purpose, there is suitable, for example, a mixture of 70 parts of the aforesaid sodium salt and 30 parts of the disodium salt of N-benzyl-μ-heptadecyl-benzimidazole disulfonic acid. Octadecyl-β-hydroxyethyl-thioether or octadecyl-β-hydroxyethylether or N-(β-hydroxypropyl)-stearic acid amide or the β-hydroxyethylamide of cocoanut fatty acid can also be esterified in the same manner with maleic acid. Esters of fumaric acid can be prepared by adding a small quantity of a strong acid to the mixture of the starting materials and heating it until one molecular proportion of water is split off.

Instead of the disodium salt of the above benzimidazole disulfonic acid the sodium salt of the acid sulfuric acid ester of dodecyl alcohol or of the monocetyl ester of 4-sulfophthalic acid or of β-[N-oleoyl-N-methyl-amino]-ethane sulfonic acid or of the oleic acid ester of β-hydroxyethane-sulfonic acid or of the sulfonic acid of the formula

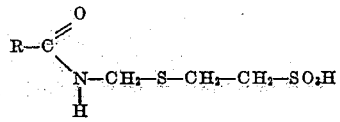

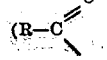

being the acyl radical of commercial stearic acid) may be used.

Example 2

32.5 parts of N-(β-hydroxyethyl)-oleic acid amide and 9.8 parts of maleic anhydride are stirred at 95-100° C. until a test portion when neutralized with sodium hydroxide solution gives a clear solution in water. This is the case after a few hours. The resulting semi-ester of maleic acid of the formula

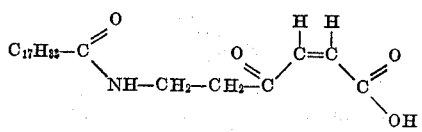

is dissolved in ethyl alcohol, neutralized with sodium hydroxide solution, and evaporated to dryness. The residue so obtained is a solid mass, which, when taken up in water, forms a clear, foaming solution. The new sodium salt can be used as a textile assistant, for example, as a softening agent for cellulose fibers. It finds application as a textile assistant, especially in admixture with the lime-resistant dispersing agents as mentioned in Example 1. Mixtures of this type may contain 20-40 per cent. of the lime-resistant dispersing agent.

Example 3

6.3 parts of stearic acid β-hydroxyethyl ester and 2.1 parts of maleic anhydride are heated, while stirring, at 95-100° C. for about 3 hours, the esterification mixture is dissolved in ethyl alcohol, neutralized with dilute sodium hydroxide solution, and the whole is evaporated to dryness. The new sodium salt of a compound of the formula

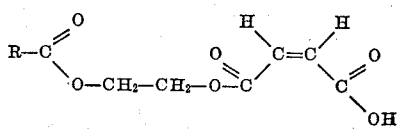

wherein

represents the acyl radical of commercial stearic acid, so obtained, which can be freed from small quantities of a by-product by extraction with acetone, is an approximately colorless mass, which dissolves in warm water to form a foaming solution. It can be used as a textile assistant, for example, as a softening agent, especially in admixture with the lime-resistant dispersing agents as mentioned in Example 1. Mixtures of this type may contain 20-30 per cent. of the lime-resistant dispersing agent.

The β-hydroxyethyl ester of oleic acid or of cocoanut fatty acid can be prepared in a similar manner.

Example 4

Viscose rayon yarn is softened in the following manner: 0.015 part of the mixture described in Example 1 is dissolved in 300 parts of water of 20° German hardness, and 10 parts of viscose rayon yarn are treated with the solution at 30° C. for 30 minutes. After centrifuging and drying, the yarn so treated has a very soft and smooth feel.

What I claim is:

1. A water-soluble composition of matter producing a softening effect on regenerated cellulose when applied in hard water, consisting essentially of (a) 50 to 90% of a water-soluble salt of a semi-ester of an unsaturated aliphatic dicarboxylic acid of the formula

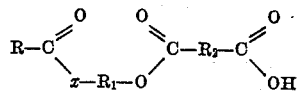

wherein

is the acyl radical of a fatty acid containing at least 12 carbon atoms, $x$ is a member selected from the group consisting of imino nitrogen and oxygen, $R_1$ is alkylene and $R_2$ is unsaturated alkylene, and (b) 10 to 50% of a lime-resistant dispersing agent, in which an aliphatic radical containing at least 12 carbon atoms is bound to a sulfonic acid group by a bridge containing at least one hetero atom, said agent being selected from the group consisting of sulfonated μ-alkyl-benzimidazoles wherein the μ-alkyl radical contains at least 12 carbon atoms, acid sulfuric acid esters of fatty alcohols containing at least 12 carbon atoms, aliphatic amino sulfonic acids wherein the amino group is acylated by a fatty acid containing at least 12 carbon atoms, aliphatic hydroxy sulfonic acids wherein the hydroxy group is acylated by a fatty acid containing at least 12 carbon atoms, and mono-esters of fatty alcohols containing at least 12 carbon atoms with aromatic dicarboxylic monosulfonic acids of the benzene series.

2. A water-soluble composition of matter producing a softening effect on regenerated cellulose when applied in hard water, consisting essentially of (a) 50 to 90% of a water-soluble salt of a semi-ester of an unsaturated aliphatic dicarboxylic acid of the formula

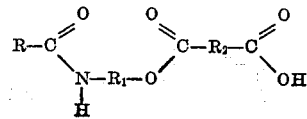

wherein

is the acyl radical of a fatty acid containing at least 12 carbon atoms, $R_1$ is alkylene and $R_2$ is unsaturated alkylene, and (b) 10 to 50% of a lime-resistant dispersing agent, in which an aliphatic radical containing at least 12 carbon atoms is bound to a sulfonic acid group by a bridge containing at least one hetero atom, said agent being selected from the group consisting of sulfonated μ-alkyl-benzimidazoles wherein the μ-alkyl radical contains at least 12 carbon atoms, acid sulfuric acid esters of fatty alcohols containing at least 12 carbon atoms, aliphatic amino sulfonic acids wherein the amino group is acylated by a fatty acid containing at least 12 carbon atoms, aliphatic hydroxy sulfonic acids wherein the hydroxy group is acylated by a fatty acid containing at least 12 carbon atoms, and mono-esters of fatty alcohols containing at least 12 carbon atoms with aromatic dicarboxylic monosulfonic acids of the benzene series.

3. A water-soluble composition of matter producing a softening effect on regenerated cellulose when applied in hard water, consisting essentially of (a) 50 to 90% of a water-soluble salt of a semi-ester of an unsaturated aliphatic dicarboxylic acid of the formula

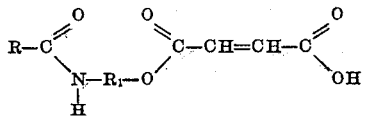

wherein

is the acyl radical of a fatty acid containing at least 12 carbon atoms, and $R_1$ is alkylene, and (b) 10 to 50% of a lime-resistant dispersing agent, in which an aliphatic radical containing at least 12 carbon atoms is bound to a sulfonic acid group by a bridge containing at least one hetero atom, said agent being selected from the group consisting of sulfonated $\mu$-alkyl-benzimidazoles wherein the $\mu$-alkyl radical contains at least 12 carbon atoms, acid sulfuric acid esters of fatty alcohols containing at least 12 carbon atoms, aliphatic amino sulfonic acids wherein the amino group is acylated by a fatty acid containing at least 12 carbon atoms, aliphatic hydroxy sulfonic acids wherein the hydroxy group is acylated by a fatty acid containing at least 12 carbon atoms, and mono-esters of fatty alcohols containing at least 12 carbon atoms with aromatic dicarboxylic monosulfonic acids of the benzene series.

4. A water-soluble composition of matter producing a softening effect on regenerated cellulose when applied in hard water, consisting essentially of (a) 50 to 90% of a water-soluble salt of a semi-ester of an unsaturated aliphatic dicarboxylic acid of the formula

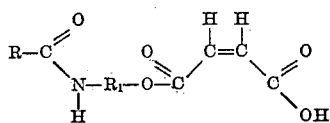

wherein

is the acyl radical of a fatty acid containing 16–18 carbon atoms, and $R_1$ is alkylene, and (b) 10 to 50% of a lime-resistant dispersing agent, in which an aliphatic radical containing at least 12 carbon atoms is bound to a sulfonic acid group by a bridge containing at least one hetero atom, said agent being selected from the group consisting of sulfonated $\mu$-alkyl-benzimidazoles wherein the $\mu$-alkyl radical contains at least 12 carbon atoms, acid sulfuric acid esters of fatty alcohols containing at least 12 carbon atoms, aliphatic amino sulfonic acids wherein the amino group is acylated by a fatty acid containing at least 12 carbon atoms, aliphatic hydroxy sulfonic acids wherein the hydroxy group is acylated by a fatty acid containing at least 12 carbon atoms, and monoesters of fatty alcohols containing at least 12 carbon atoms with aromatic dicarboxylic monosulfonic acids of the benzene series.

5. A water-soluble composition of matter producing a softening effect on regenerated cellulose when applied in hard water, consisting essentially of (a) 50 to 90% of a water-soluble salt of a semi-ester of an unsaturated aliphatic dicarboxylic acid of the formula

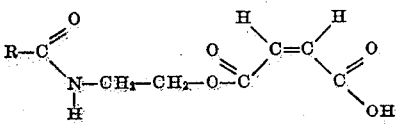

wherein

is the acyl radical of a fatty acid containing 16 to 18 carbon atoms, and (b) 10 to 50% of a lime-resistant dispersing agent, in which an aliphatic radical containing at least 12 carbon atoms is bound to a sulfonic acid group by a bridge containing at least one hetero atom, said agent being selected from the group consisting of sulfonated $\mu$-alkyl-benzimidazoles wherein the $\mu$-alkyl radical contains at least 12 carbon atoms, acid sulfuric acid esters of fatty alcohols containing at least 12 carbon atoms, aliphatic amino sulfonic acids wherein the amino group is acylated by a fatty acid containing at least 12 carbon atoms, aliphatic hydroxy sulfonic acids wherein the hydroxy group is acylated by a fatty acid containing at least 12 carbon atoms, and mono-esters of fatty alcohols containing at least 12 carbon atoms with aromatic dicarboxylic monosulfonic acids of the benzene series.

6. A water-soluble composition of matter producing a softening effect on regenerated cellulose when applied in hard water, consisting essentially of (a) 50 to 90% of a water-soluble salt of a semi-ester of an unsaturated aliphatic dicarboxylic acid of the formula

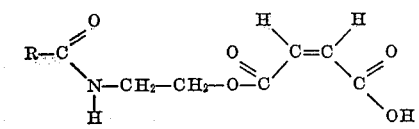

wherein

is the acyl radical of commercial stearic acid and (b) 10 to 50% of a lime-resistant dispersing agent, in which an aliphatic radical containing at least 12 carbon atoms is bound to a sulfonic acid group by a bridge containing at least one hetero atom, said agent being selected from the group consisting of sulfonated $\mu$-alkyl-benzimidazoles wherein the $\mu$-alkyl radical contains at least 12 carbon atoms, acid sulfuric acid esters of fatty alcohols containing at least 12 carbon atoms, aliphatic amino sulfonic acids wherein the amino group is acylated by a fatty acid containing at least 12 carbon atoms, aliphatic hydroxy sulfonic acids wherein the hydroxy group is acylated by a fatty acid containing at least 12 carbon atoms, and mono-esters of fatty alcohols containing at least 12 carbon atoms with aromatic dicarboxylic monosulfonic acids of the benzene series.

7. A water-soluble composition of matter producing a softening effect on regenerated cellulose when applied in hard water, consisting essentially of (a) 50 to 90% of a water-soluble salt of a semi-ester of an unsaturated aliphatic dicarboxylic acid of the formula

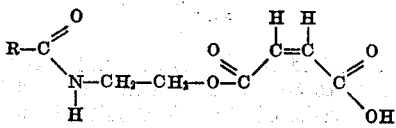

wherein

is the acyl radical of commercial stearic acid and (b) 10 to 50% of an alkali salt of a sulfonated μ-alkyl-benzimidazole wherein the μ-alkyl radical contains at least 11 carbon atoms.

8. A water-soluble composition of matter producing a softening effect on regenerated cellulose when applied in hard water, consisting essentially of (a) 50 to 90% of a water-soluble salt of a semi-ester of an unsaturated aliphatic dicarboxylic acid of the formula

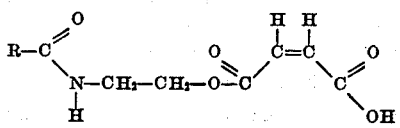

wherein

is the acyl radical of commercial stearic acid, and (b) 10 to 50% of an alkali salt of N-benzyl-μ-heptadecyl-benzimidazole-disulfonic acid.

9. A water-soluble composition of matter producing a softening effect on regenerated cellulose when applied in hard water, consisting essentially of (a) 50 to 90% of a water-soluble salt of a semi-ester of an unsaturated aliphatic dicarboxylic acid of the formula

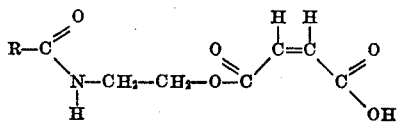

wherein

is the acyl radical of commercial oleic acid and (b) 10 to 50% of a lime-resistant dispersing agent, in which an aliphatic radical containing at least 12 carbon atoms is bound to a sulfonic acid group by a bridge containing at least one hetero atom, said agent being selected from the group consisting of sulfonated μ-alkyl-benzimidazoles wherein the μ-alkyl radical contains at least 12 carbon atoms, acid sulfuric acid esters of fatty alcohols containing at least 12 carbon atoms, aliphatic amino sulfonic acids wherein the amino group is acylated by a fatty acid containing at least 12 carbon atoms, aliphatic hydroxy sulfonic acids wherein the hydroxy group is acylated by a fatty acid containing at least 12 carbon atoms, and mono-esters of fatty alcohols containing at least 12 carbon atoms with aromatic dicarboxylic monosulfonic acids of the benzene series.

10. A water-soluble composition of matter producing a softening effect on regenerated cellulose when applied in hard water, consisting essentially of (a) 50 to 90% of a water-soluble salt of a semi-ester of an unsaturated aliphatic dicarboxylic acid of the formula

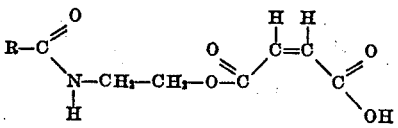

wherein

is the acyl radical of commercial oleic acid, and (b) 10 to 50% of an alkali salt of a sulfonated μ-alkyl-benzimidazole wherein the μ-alkyl radical contains at least 11 carbon atoms.

11. A water-soluble composition of matter producing a softening effect on regenerated cellulose when applied in hard water, consisting essentially of (a) 50 to 90% of a water-soluble salt of a semi-ester of an unsaturated aliphatic dicarboxylic acid of the formula

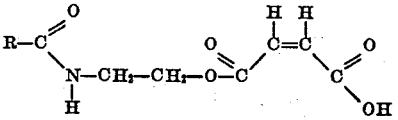

wherein

is the acyl radical of commercial oleic acid and (b) 10 to 50% of an alkali salt of N-benzyl-μ-heptadecyl-benzimidazole disulfonic acid.

12. A water-soluble composition of matter producing a softening effect on regenerated cellulose when applied in hard water, consisting essentially of (a) 50 to 90% of a water-soluble salt of a semi-ester of an unsaturated aliphatic dicarboxylic acid of the formula

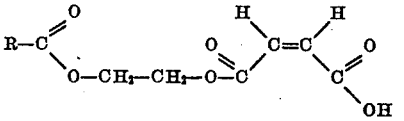

wherein

is the acyl radical of commercial stearic acid and (b) 10 to 50% of a lime-resistant dispersing agent, in which an aliphatic radical containing at least 12 carbon atoms is bound to a sulfonic acid group by a bridge containing at least one hetero atom, said agent being selected from the group consisting of sulfonated μ-alkyl-benzimidazoles wherein the μ-radical contains at least 12 carbon atoms, acid sulfuric acid esters of fatty alcohols containing at least 12 carbon atoms, aliphatic amino sulfonic acids wherein the amino group is acylated by a fatty acid containing at least 12 carbon atoms, aliphatic hydroxy sulfonic acids wherein the hydroxy group is acylated by a fatty acid containing at least 12 carbon atoms, and monoesters of fatty alcohols containing at least 12 carbon atoms with aromatic dicarboxylic monosulfonic acids of the benzene series.

13. A water-soluble composition of matter producing a softening effect on regenerated cellulose when applied in hard water, consisting essentially of (a) 50 to 90% of a water-soluble salt of a semi-ester of an unsaturated aliphatic dicarboxylic acid of the formula

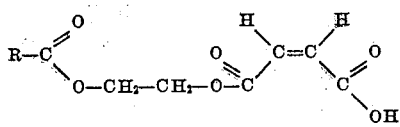

wherein

is the acyl radical of commercial stearic acid and (b) 10 to 50% of an alkali salt of a sulfonated µ-alkyl-benzimidazole wherein the µ-alkyl radical contains at least 11 carbon atoms.

14. A water-soluble composition of matter producing a softening effect on regenerated cellulose when applied in hard water, consisting essentially of (a) 50 to 90% of a water-soluble salt of a semi-ester of an unsaturated aliphatic dicarboxylic acid of the formula

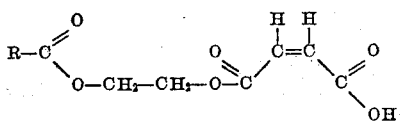

wherein

is the acyl radical of commercial stearic acid, and (b) 10 to 50% of an alkali salt of N-benzyl-µ-heptadecyl-benzimidazole disulfonic acid.

OTTO ALBRECHT.

REFERENCES CITED

The following references are of record in the file of this patent:

UNITED STATES PATENTS

| Number | Name | Date |
|---|---|---|
| 2,023,976 | Roberts | Dec. 10, 1935 |
| 2,036,525 | Granacher | Apr. 7, 1936 |
| 2,043,164 | Granacher | June 2, 1936 |
| 2,069,570 | Albrecht | Feb. 7, 1937 |
| 2,106,240 | De Groote et al. | Jan. 25, 1938 |
| 2,143,765 | Dickey et al. | Jan. 10, 1939 |
| 2,232,485 | Shipp | Feb. 18, 1941 |
| 2,246,264 | Pinkernelle | June 17, 1941 |
| 2,343,431 | Wells et al. | Mar. 7, 1944 |
| 2,417,513 | Nelles | Mar. 18, 1947 |

FOREIGN PATENTS

| Number | Country | Date |
|---|---|---|
| 531,316 | Great Britain | Jan. 2, 1941 |